US008884948B2

(12) United States Patent
Turner et al.

(10) Patent No.: US 8,884,948 B2
(45) Date of Patent: Nov. 11, 2014

(54) METHOD AND SYSTEM FOR CREATING DEPTH AND VOLUME IN A 2-D PLANAR IMAGE

(75) Inventors: Tara Handy Turner, Marina Del Rey, CA (US); Evan M. Goldberg, Los Angeles, CA (US); Matthew F. Schnittker, Castaic, CA (US); Joseph W. Longson, Castaic, CA (US); Robert M. Neuman, Santa Clarita, CA (US); Lewis N. Siegel, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 990 days.

(21) Appl. No.: 12/571,406

(22) Filed: Sep. 30, 2009

(65) Prior Publication Data
US 2011/0074778 A1 Mar. 31, 2011

(51) Int. Cl.
G06T 15/00 (2011.01)
G06T 15/40 (2011.01)
H04N 13/00 (2006.01)
G06K 9/00 (2006.01)
H04N 13/02 (2006.01)

(52) U.S. Cl.
CPC .................................. *H04N 13/026* (2013.01)
USPC ........... 345/419; 345/421; 345/426; 345/473; 345/422; 348/42; 348/51; 382/154

(58) Field of Classification Search
None
See application file for complete search history.

(56) References Cited

U.S. PATENT DOCUMENTS

| 4,925,294 | A | 5/1990 | Geshwind et al. |
| 5,510,832 | A | 4/1996 | Garcia |
| 6,208,348 | B1 | 3/2001 | Kaye |
| 6,515,659 | B1 | 2/2003 | Kaye |
| 6,590,573 | B1 | 7/2003 | Geshwind |
| 6,686,926 | B1 | 2/2004 | Kaye |
| 7,082,223 | B1 * | 7/2006 | Harris ........................... 382/264 |

(Continued)

FOREIGN PATENT DOCUMENTS

| WO | 2004/021151 A2 | 3/2004 |
| WO | 2008/060289 A1 | 5/2008 |

OTHER PUBLICATIONS

Johnston, Scott F., "Non-Photorealistic Animation and Rendering," Proceedings of the $2^{nd}$ International Symposium on Non-Photorealistic Animation and Rendering, Annecy, France, pp. 45-ff, 2002.

(Continued)

*Primary Examiner* — Tize Ma
(74) *Attorney, Agent, or Firm* — Dorsey & Whitney LLP

(57) ABSTRACT

Implementations of the present disclosure involve methods and systems for creating depth and volume in a 2-D image by utilizing a plurality of layers of the 2-D image, where each layer comprises one or more portions of the 2-D image. Each layer may be reproduced into a corresponding left eye and right eye layers that include a depth pixel offset corresponding to a perceived depth. Further, a volume effect may also be applied to one or more objects of the 2-D image by associating a volume pixel offset to one or more pixels of the image. Thus, any pixel of the 2-D image may have a depth pixel offset to provide a perceived depth as well as a volume pixel offset to provide a stereoscopic 3-D volume effect. In this manner, the 2-D image may be converted to a corresponding stereoscopic 3-D image with perceived depth and volume effects applied.

25 Claims, 12 Drawing Sheets

(56) References Cited

U.S. PATENT DOCUMENTS

| | | |
|---|---|---|
| 7,102,633 B2 | 9/2006 | Kaye |
| 7,116,323 B2 | 10/2006 | Kaye |
| 7,116,324 B2 | 10/2006 | Kaye |
| 7,254,265 B2 | 8/2007 | Naske et al. |
| 7,256,779 B2 | 8/2007 | Donnelly |
| 7,573,475 B2 | 8/2009 | Sullivan et al. |
| 7,639,838 B2 * | 12/2009 | Nims ............................ 382/103 |
| 8,502,862 B2 * | 8/2013 | Turner et al. .................... 348/46 |
| 2002/0118275 A1 | 8/2002 | Harman |
| 2002/0186216 A1 | 12/2002 | Baumberg et al. |
| 2003/0007681 A1 | 1/2003 | Baker |
| 2004/0222988 A1 | 11/2004 | Donnelly |
| 2005/0254702 A1 | 11/2005 | Era |
| 2006/0184279 A1 | 8/2006 | Okamoto et al. |
| 2007/0279415 A1 | 12/2007 | Sullivan et al. |
| 2008/0247670 A1 | 10/2008 | Tam et al. |
| 2009/0195643 A1 | 8/2009 | Neuman |
| 2009/0196492 A1 | 8/2009 | Jung et al. |
| 2009/0219283 A1 * | 9/2009 | Hendrickson et al. ........ 345/420 |
| 2009/0219383 A1 * | 9/2009 | Passmore ........................ 348/44 |
| 2009/0322860 A1 | 12/2009 | Zhang et al. |
| 2010/0073364 A1 | 3/2010 | Jung et al. |
| 2010/0080448 A1 | 4/2010 | Tam et al. |
| 2010/0265248 A1 | 10/2010 | McCrae et al. |
| 2011/0050687 A1 * | 3/2011 | Alyshev et al. ............... 345/419 |
| 2011/0050864 A1 * | 3/2011 | Bond .............................. 348/51 |
| 2011/0074784 A1 | 3/2011 | Turner et al. |
| 2011/0210969 A1 | 9/2011 | Barenbrug |
| 2011/0304691 A1 * | 12/2011 | Newton et al. .................. 348/43 |

OTHER PUBLICATIONS

Petrovic et al., "Shadows for Cel Animation," Proceedings of SIGGRAPH2000, pp. 511-516, 2000.

European Patent Office extended European search report for application No. 10179710.8 dated May 27, 2013 7 pages.

Battiato, et al., "3D stereoscopic image pairs by depth-map generation", Proceedings of the 2nd International Symposium on 3D Data Processing, Visualization, and Transmission (3DPVT'04), IEEE, 2004, 8 pages.

Brimelow, "New tutorial on parallax 3D effects", http://www.leebrimelow.com/new-tutorial-on-parallax-3d-effects/. Published on Dec. 5, 2008, 7 pages.

Johnston, "Lumo: Illumination for Cel Animation", Proceedings of the 2nd International Symposium on Non-Photorealistic Animation and Rendering, Annecy, France, 2002, pp. 45-52 and 156.

"US Final Office Action dated May 24, 2012", U.S. Appl. No. 12/571,412, filed Sep. 30, 2009, 50 pages.

Tam et al., "3D-TV Content Generation: 2D-to-3D Conversion", 2006 IEEE International Conference on Multimedia and Expo (Jul. 12, 2006), 1869-1872.

* cited by examiner

METHOD AND SYSTEM FOR CREATING DEPTH AND VOLUME IN A 2-D PLANAR IMAGE

FIELD OF THE INVENTION

Aspects of the present invention relate to conversion of two dimensional (2-D) multimedia content to three dimensional (3-D) or stereoscopic multimedia content. More particularly, aspects of the present invention involve a system and method for creating depth in a 2-D planar image and volume in one or more objects within the planar image.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the pixel offset between the left eye frame and the right eye frame provides a perceived depth to the objects in the frames, thereby presenting the combined frames in what appears as three dimensions.

In creating stereoscopic 3-D animation from 2-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

One implementation of the present disclosure may take the form of a method for generating stereoscopic volume for a two dimensional digital image. The method may comprise the operations of obtaining a first two dimensional image comprising a first image portion and a second image portion and generating a second two dimensional image. The second image may comprise a duplicate of the first image portion and a duplicate of the second image portion. The method may also comprise the operation of horizontally offsetting the first image portion relative to the duplicate of the first image portion a first amount and the second image portion relative to the duplicate of the second image portion a second amount, different from the first amount. The method may also include the operation of wherein the image and the copy of the image are displayed substantially contemporaneously for stereoscopic viewing of the image.

Another implementation of the present disclosure may take the form of a method for generating a stereoscopic image from a two dimensional image. The method may comprise the operations of obtaining a two dimensional digital image comprising a first plurality of pixel values and obtaining a gray scale object of the digital image. The gray scale object may have a plurality of gray scale values relative to each of the first plurality of pixel values. The method may also include the operations of obtaining a copy of the two dimensional image comprising a second plurality of pixel values corresponding to the first plurality of pixel values and horizontally displacing one or more of the second plurality of pixel values based upon the gray scale value for the first plurality of pixel values.

Still another embodiment of the present disclosure may take the form of a system for generating a stereoscopic frame. The system may comprise a database and one or more computing systems. The database may be configured to store a two dimensional frame comprising a first plurality of pixels. In addition, the computing systems may be associated with the database to access the two dimensional frame and may be configured to perform operations of a method. Such operations include retrieving the two dimensional frame, generating a copy of the frame with a copy of the first plurality of pixels values and creating a gray scale object of the frame having a plurality of gray scale values relative to each of the first plurality of pixel values. The method may also include generating a copy of the two dimensional frame comprising a second plurality of pixel values corresponding to the first plurality of pixel values and horizontally displacing one or more of the second plurality of pixel values based upon the gray scale value for the first plurality of pixel values.

DETAILED DESCRIPTION

Implementations of the present invention involve methods and systems for creating depth and volume in a 2-D planar image for an associated stereoscopic 3-D image by utilizing a plurality of layers of the 2-D image, where each layer comprises one or more portions of the 2-D image. Each layer may be reproduced into a corresponding left eye version and of the layer and a corresponding right eye version of the layer. Further, the left eye layer and the right eye layer may include a depth pixel offset corresponding to a perceived depth within the stereoscopic 3-D image. In addition, a volume effect may also be applied to one or more objects of the 2-D image. The volume effect may be achieved by associating a volume pixel offset to one or more pixels of the object in addition to the depth pixel offset. Thus, any pixel of the 2-D image may have a depth pixel offset to provide that pixel with a perceived depth within the stereoscopic 3-D image as well as a volume pixel offset to provide a stereoscopic 3-D volume effect to an object of the image. In this manner, the 2-D image may be converted to a corresponding stereoscopic 3-D image with perceived depth and volume effects applied. Further, this process may be applied to each image of an animated feature film to convert the film from 2-D to stereoscopic 3-D.

For convenience, the embodiments described herein refer to a 2-D image as a "frame" or "2-D frame." However, it should be appreciated that the methods and devices described herein may be used to convert any 2-D multimedia image into a stereoscopic 3-D image, such as a photo, a drawing, a computer file, a frame of a live action film, a frame of an animated film, a frame of a video or any other 2-D multimedia image. Further, the term "layer" as used herein indicates any portion of a 2-D frame, including any object, set of objects, or one or more portions of an object from a 2-D frame. Thus, the volume effects described herein may be applied to any portion of a 2-D frame, irrespective of whether the effects are described with respect to layers, objects or pixels of the frame.

Figure 1:
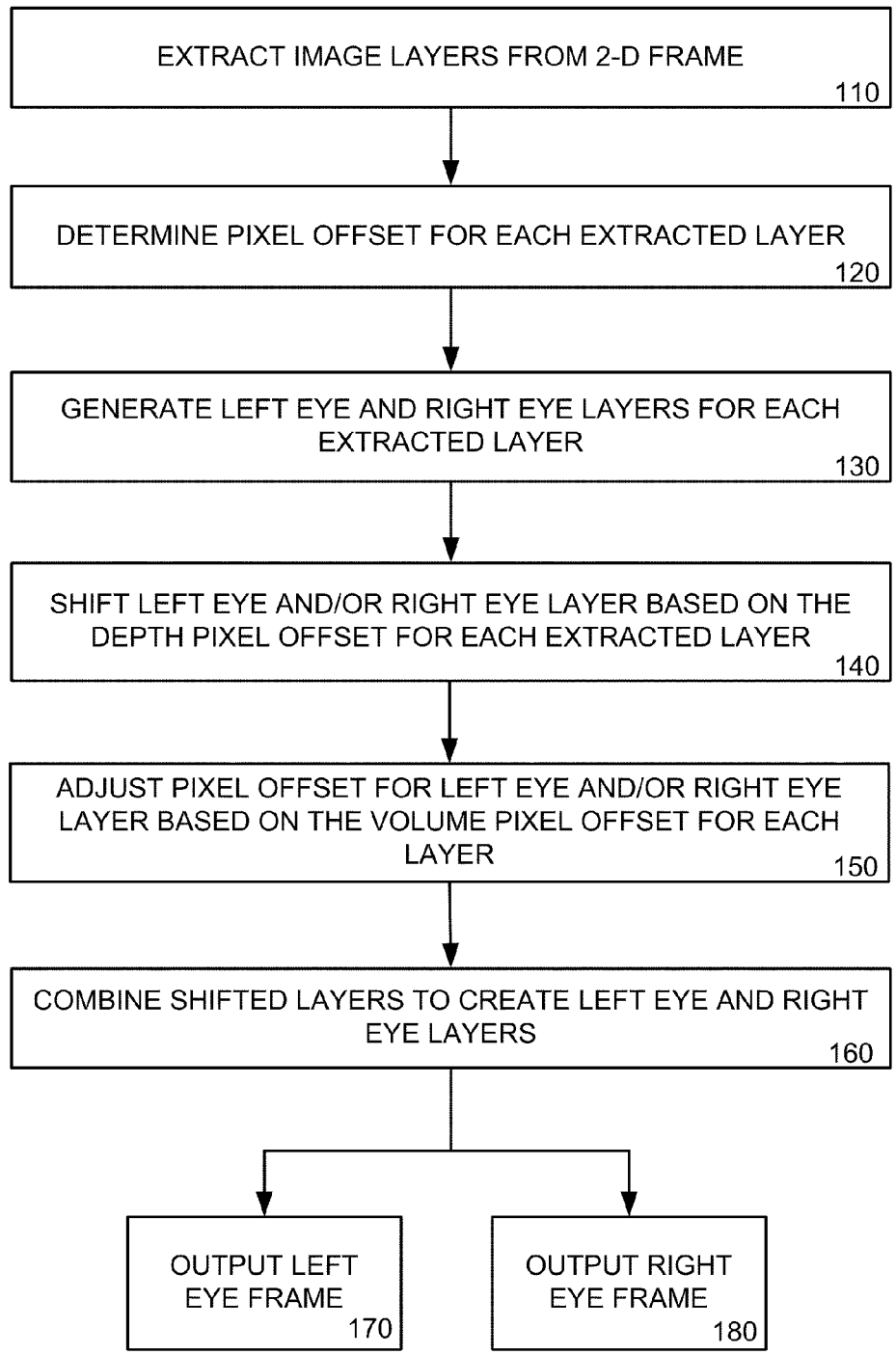
FIG. 1 is a flowchart of a method for converting a 2-D frame to a stereoscopic 3-D frame by extracting one or more layers of the 2-D frame and applying a pixel offset to each layer.

FIG. 1 is a flowchart of a method for converting a 2-D multimedia frame to a stereoscopic 3-D multimedia frame by utilizing layers of the 2-D frame. Several operations of the method are described in detail in related United States patent application Ser. No. 12/571,407 titled "METHOD AND SYSTEM FOR UTILIZING PRE-EXISTING IMAGE LAYERS OF A TWO DIMENSIONAL IMAGE TO CREATE A STEREOSCOPIC IMAGE" by Tara Handy Turner et. al., the contents of which are incorporated in their entirety by reference herein. By performing the following operations for each frame of a 2-D animated film and combining the converted frames in sequence, the animated 2-D film may similarly be converted into a stereoscopic 3-D film. In one embodiment, the operations may be performed by one or more workstations or other computing systems to convert the 2-D frames into stereoscopic 3-D frames.

Figure 2:
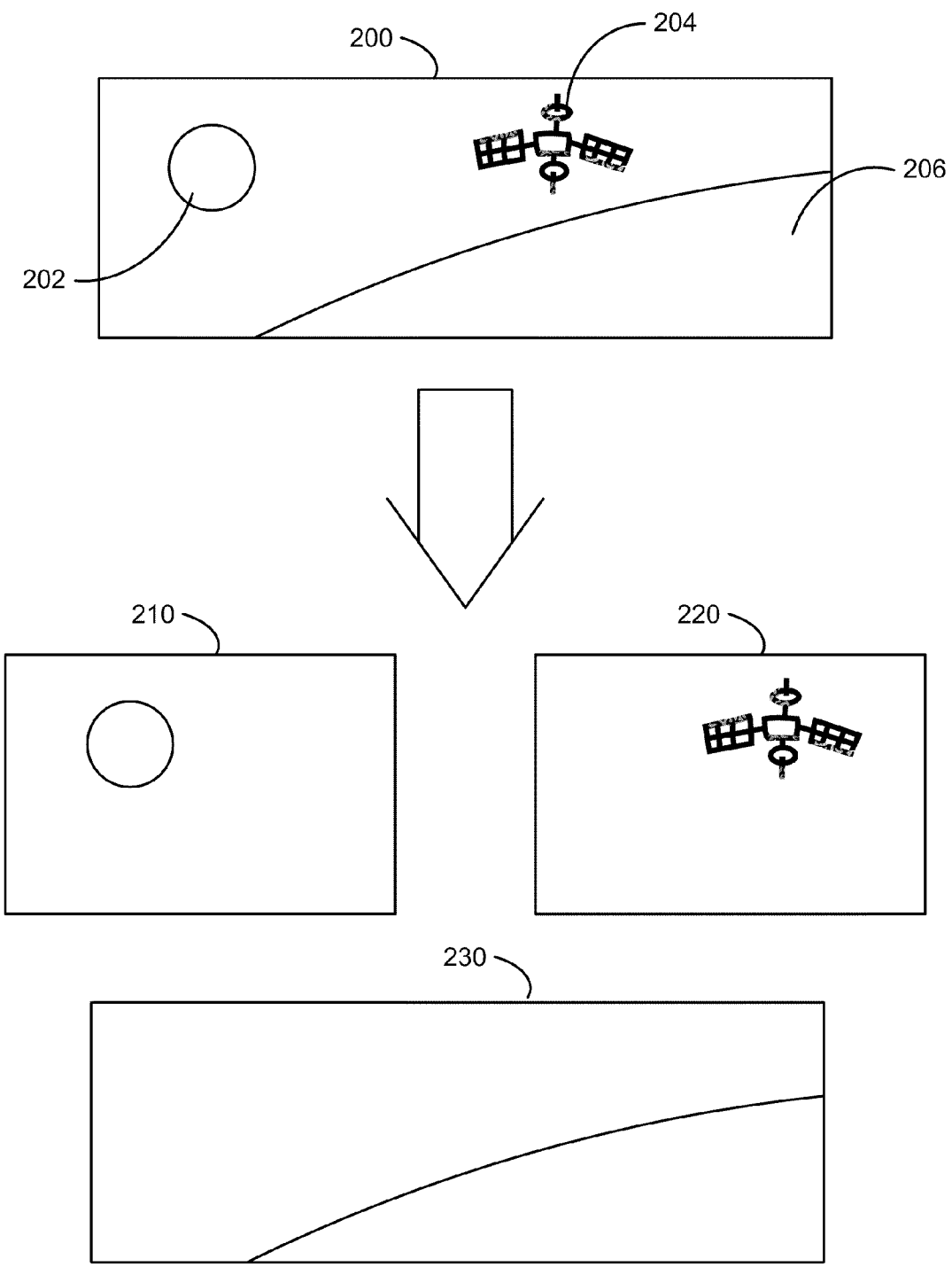
FIG. 2 is a diagram illustrating a plurality of layers of a frame of an animated multimedia presentation.

The method may begin in operation 110 where one or more layers are extracted from the 2-D frame by a computer system. A layer may comprise one or more portions of the 2-D frame. The example 2-D frame 200 of FIG. 2 illustrates a space scene including three objects; namely, a moon 202, a satellite 204 and a planet 206. Each of these objects are extracted from the 2-D image or otherwise provided as separate layers of the frame 200. The layers of the 2-D image 200 may include any portion of the 2-D image, such as an object, a portion of the object or a single pixel of the image. As used herein, a layer refers to a collection of data, such as pixel data, for a discrete portion of image data where the meaningful color data exists for the entirety of the image or, in some cases, for some area less than the entirety of image data. For example, if an image consists of a moon 202, satellite 204 and a planet 206, image data for the moon may be provided on a layer and image data for the satellite and planet may be provided on separate and distinct layers.

The layers can be extracted from the composite 2-D frame in several ways. For example, the content of each extracted layer can be digitally extracted from the 2-D frame by a computing system utilizing a rotoscoping tool or other computer image processing tool to digitally remove a given object(s) and insert a given object(s) into a distinct layer. In another example, the layers for a 2-D frame may be digitally stored separately in a computer-readable database. For example, distinct layers pertaining to each frame of a cell animated feature film may be digitally stored in a database, such as the Computer Animation Production System (CAPS) developed by the Walt Disney Company in the late 1980s.

Figure 3:
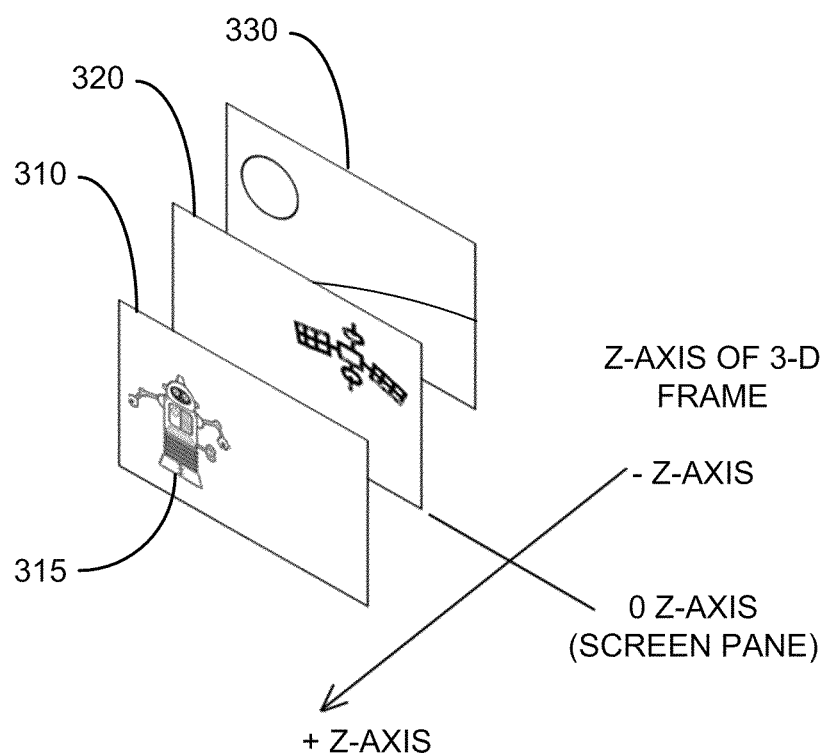
FIG. 3 is a diagram illustrating the position of several layers of a stereoscopic 3-D frame along a perceptual z-axis of the virtual stereoscopic 3-D frame.

Upon extraction of a layer or otherwise obtaining layer pixel data, a user or the computing system may determine a pixel offset for the layer pixel data in operation 120. Each pixel, or more likely a collection of adjacent pixels, of the 2-D frame may have an associated pixel offset that determines the object's perceived depth in the corresponding stereoscopic 3-D frame. For example, FIG. 3 is a diagram illustrating the perceived position of several layers of a stereoscopic 3-D frame along a z-axis of the stereoscopic 3-D frame. As used herein, the z-axis of a stereoscopic 3-D frame or image represents the perceived position of a layer of the frame when viewed as a stereoscopic 3-D image. In one particular embodiment, any layer 310 of the stereoscopic 3-D frame appearing in the foreground of the frame has a corresponding positive z-axis position that indicates the position of the layer relative to the plane of the screen from which the stereoscopic 3-D frame is presented. Additionally, any layer 330 appearing in the background of the stereoscopic 3-D frame has a corresponding negative z-axis position while a layer 320 appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. This position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

In the example of FIG. 3, each pixel of any particular layer of the 2-D frame has the same pixel offset. Thus, each object of the layer appears at the same z-axis position within the stereoscopic 3-D frame. Moreover, while each object, e.g. the moon 202, the satellite 204 and the planet 206, are given a z-axis depth, each object appears flat or with no volume. Stated differently, initially a pixel offset is applied uniformly to all pixels of a given object. To provide a non-flat appearance of a given object and a more realistic stereoscopic 3-D effect, the pixel offset of one or more pixels of the layer is adjusted to add volume, also referenced to as inflation, to the objects of the layer, or to otherwise provide non-uniformity to the object through variable pixel offsets.

For example, returning to FIG. 2, the moon 202 object has a round shape. While the stereoscopic depth of the moon layer 210 layer provides a stereoscopic depth as to the orientation of the moon in relation to the other shapes of the frame, the moon object itself still appears flat. Thus, to provide a volume stereoscopic 3-D effect to the moon 202 object, pixel offset for the pixels defining the moon object are adjusted such that the pixels of the moon are located either in the foreground or background of the stereoscopic 3-D frame in relation to the moon layer 210, or are not adjusted and are maintained at the moon layer, thereby providing the moon object with stereoscopic volume. Several techniques to apply volume to the layers of a frame are described in greater detail herein with reference to FIGS. 5-9. This volume process may be applied to any layer of the 2-D frame, including being applied to one or more objects of a particular layer. Thus, the volume applied to one object of a particular layer may differ from the volume applied to a separate object of the same layer. Generally, the stereoscopic volume may be applied individually to any aspect of the 2-D frame. Moreover, stereoscopic volume may be applied to any given object irrespective of its relation to a layer or any other object.

Additional stereoscopic pixel offset techniques may be utilized to provide this volumetric detail to the stereoscopic 3-D frame. One such technique involves utilizing depth models applied to one or more frame layers to provide a template upon which a pixel offset adjustment may be made. Such depth models may be utilized to further tune the stereoscopic 3-D appearance of the stereoscopic 3-D frame. Several techniques related to creating depth models to render a 2-D frame in stereoscopic 3-D are provided in United States patent applications Ser. No. 12/571,412 titled "GRADIENT MODELING TOOLKIT FOR SCULPTING STEREOSCOPIC DEPTH MODELS FOR CONVERTING 2-D IMAGES INTO STEREOSCOPIC 3-D IMAGES" by Tara Handy Turner et. al., the contents of which are incorporated in their entirety by reference herein.

Once the desired depth pixel offset and the desired volume pixel offset are determined for each layer and pixel of the 2-D frame in operation 120, corresponding left eye and right eye frames are generated for each layer in operation 130 and shifted in response to the combined pixel offset in operation 140 to provide the different perspectives of the layer for the stereoscopic visual effect. For example, to create a left eye or right eye layer that corresponds to a layer of the 2-D frame, a digital copy of the 2-D layer may be generated and shifted, either to the left or to the right in relation to the original layer, a particular number of pixels based on pixel offset for relative perceptual z-axis positioning and/or individual object stereoscopic volume pixel offsetting. Hence, the system generates a frame copy of the layer information with the x or horizontal pixel values shifted uniformly some value to position the object along a perceptual z-axis relative to other objects and/or the screen, and the system further alters the x-axis or horizontal pixel position for individual pixels or groups of pixels of the object to give the object stereoscopic volume. When the corresponding left eye and right eye frames are viewed simultaneously or nearly simultaneously, the object appearing in the corresponding frames appears to have volume and be in the foreground or background of the stereoscopic 3-D frame, based on the determined pixel offset.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to created the shifted layer. As used herein, discussion of "shifting" a pixel or a layer refers to the horizontal offsetting between the original pixel value and its copy.

Figure 4:
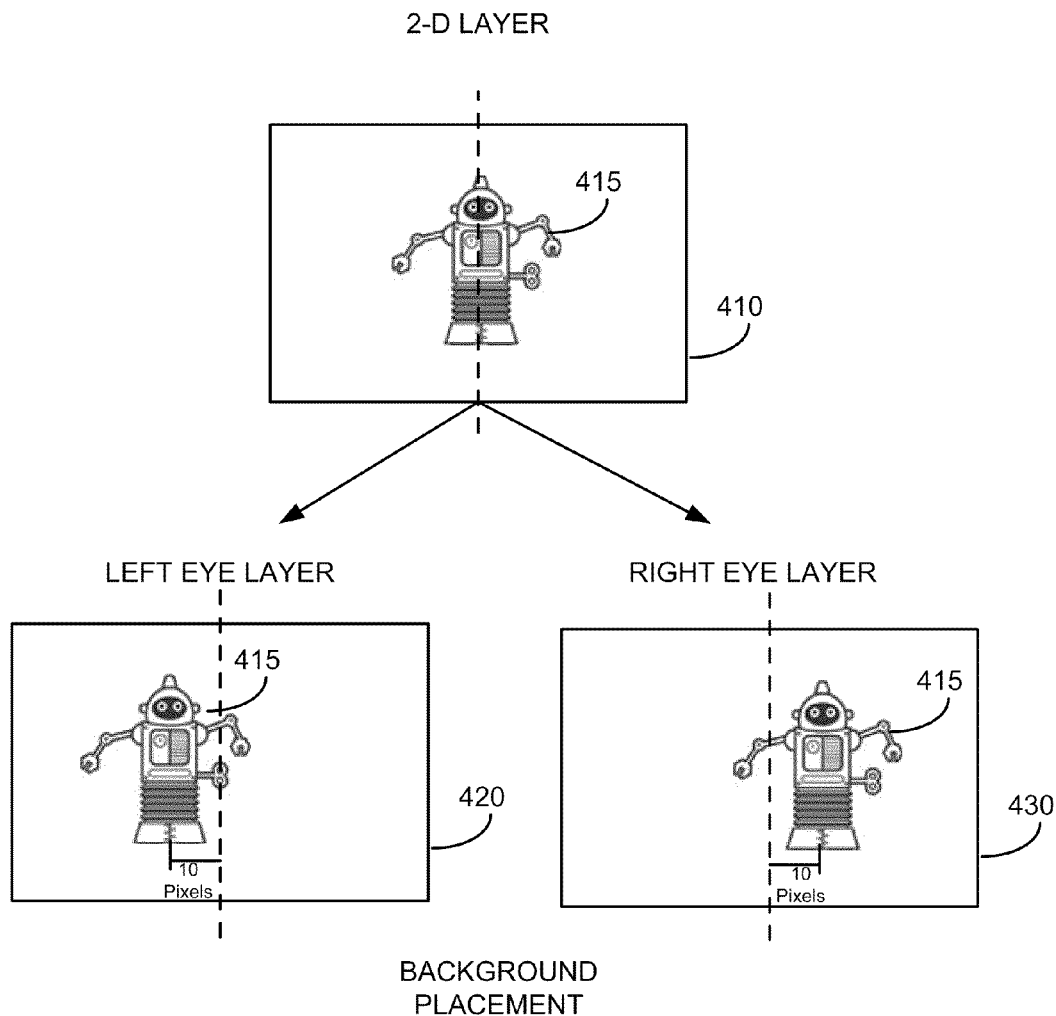
FIG. 4 is a diagram illustrating the creation of corresponding left eye and right eye layers from a 2-D layer, with both layers shifted such that the total pixel shift of the layers equals a determined pixel offset.

FIG. 4 is a diagram illustrating the creation of corresponding left eye and right eye layers from a 2-D layer, with both left eye and right eye layers shifted such that the total pixel shift of the layers equals the depth pixel offset. As shown in FIG. 4, a left eye layer 420 and a right eye layer 430 are created from the 2-D layer 410 such that the combination of the left eye layer and the right eye layer provides a stereoscopic 3-D effect to the contents of the layer. In this embodiment, the left eye layer 420 is shifted to the left while the right eye layer 430 is shifted to the right along the x-axis in response to a pixel offset. Generally, the shifting of the left eye and/or right eye layers occur in the x-axis only. When the shifted right eye layer 430 and the shifted left eye layer 420 are viewed together, the robot character 415 appears in the background, or behind the screen plane. To place a layer in the foreground of the stereoscopic 3-D frame, the corresponding left eye layer 410 is shifted to the right while the right eye layer 420 is shifted to the left along the x-axis. When the shifted right eye layer 420 and the shifted left eye layer 410 are viewed together, the robot character 415 appears in the foreground of the frame, or in front of the screen plane. In general, the depth pixel offset is achieved through the shifting of one of the left eye or right eye layers or the combined shifting of the left eye and the right eye layers in either direction.

The number of pixels that one or both of the left eye and right eye layers are shifted in operation 140 may be based on the depth pixel offset value. In one example, the pixel offset may be determined to be 20 total pixels, such that the layer may appear in the background of the stereoscopic 3-D frame. Thus, as shown in FIG. 4, the left eye layer 420 may be shifted ten pixels to the left from the original placement of the 2-D layer 410, while the right eye layer 430 may be shifted ten pixels to the right. As can be seen, the robot character 415 of the left eye layer 420 has been displaced ten pixels to the left of the center depicted by the vertical dashed line while right eye layer 430 has been displaced to the right of center by ten pixels. Thus, the total displacement of the layers between the left eye layer 420 and the right eye layer 430 is 20 pixels, based on the determined pixel offset. It should be appreciated that the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. However, shifting the left and right layers in this manner will often result in a slightly different perspective of the layer than shifting in equal amounts, but this result may generate a desired creative effect or may be negligible to the viewer while being advantageous for the purposes of simplifying an image processing step such as the extraction of the layer.

Returning to FIG. 1, in operation 150, the computer system applies a stereoscopic volume to one or more objects. The system orients a given object or layer along a perceptual z-axis by generating a copy of the object or layer and positioning the object and its copy relative to each other along an x-axis or horizontally. The degree of relative positioning determines the degree of perceptual movement fore and aft along the perceptual z-axis. However, a given object initially appears flat as the object and its copy are uniformly displaced. To provide an object with stereoscopic volume, portions of an object and the corresponding portion of the object copy are relatively positioned differently (more or less) than other portions of the object. For example, more or less x-axis pixel offset may be applied to some portion of an object copy relative to other portions of an object copy, to cause the perceived position of some portion of the object to be at a different position along the perceptual z-axis relative to other portions of the object when the left and right eye layers are displayed.

In one embodiment, a separate gray scale template is created and applied to an object of the 2-D frame such that, after application of the pixel offset to the left eye layer and the right eye layer at a percentage indicated by the gray scale value of the template image at that pixel location, the whiter portions of the gray scale correspond to pixels in the image that appear further in the foreground than the darker portions. Stated differently, the gray scale provides a map or template from which the adjusted pixel offset for each pixel of an object may be determined. In this manner, a stereoscopic volume is applied to an object. The same gray scale may be generated by utilizing one or more gradient modeling techniques.

Therefore, based on the determined depth pixel offset (which locates a layer along the z-axis of the stereoscopic 3-D frame) and the volume pixel offset (which adjusts the depth pixel offset for one or more pixels of an object to provide the object with the appearance of having a volume), the left eye layer and right eye layer are shifted to provide the stereoscopic 3-D frame with the desired stereoscopic 3-D effect. Thus, in some embodiments, each pixel of a particular stereoscopic 3-D frame may have an associated pixel offset that may differ from the pixel offsets of other pixels of the frame. In general, any pixel of the 2-D frame may have an associated pixel offset to place that pixel in the appropriate position in the rendered stereoscopic 3-D frame.

Operations 110 through 150 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that is shifted in response to the depth pixel offset for that layer and to the volume pixel offset for the objects of the layer.

In operation 160, the computer system combines each created left eye layer corresponding to a layer of the 2-D frame with other left eye layers corresponding to the other layers of the 2-D frame to construct the complete left eye frame to be presented to the viewer. Similarly, the computer system combines each right eye layer with other right eye layers of the stereoscopic 3-D frame to construct the corresponding right eye frame. The combined left eye frame is output for the corresponding stereoscopic 3-D frame in operation 170 while the right eye frame is output for the corresponding stereoscopic 3-D frame in operation 180. When viewed simultaneously or nearly simultaneously, the two frames provide a stereoscopic effect to the frame, converting the original 2-D frame to a corresponding stereoscopic 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

Figure 5:
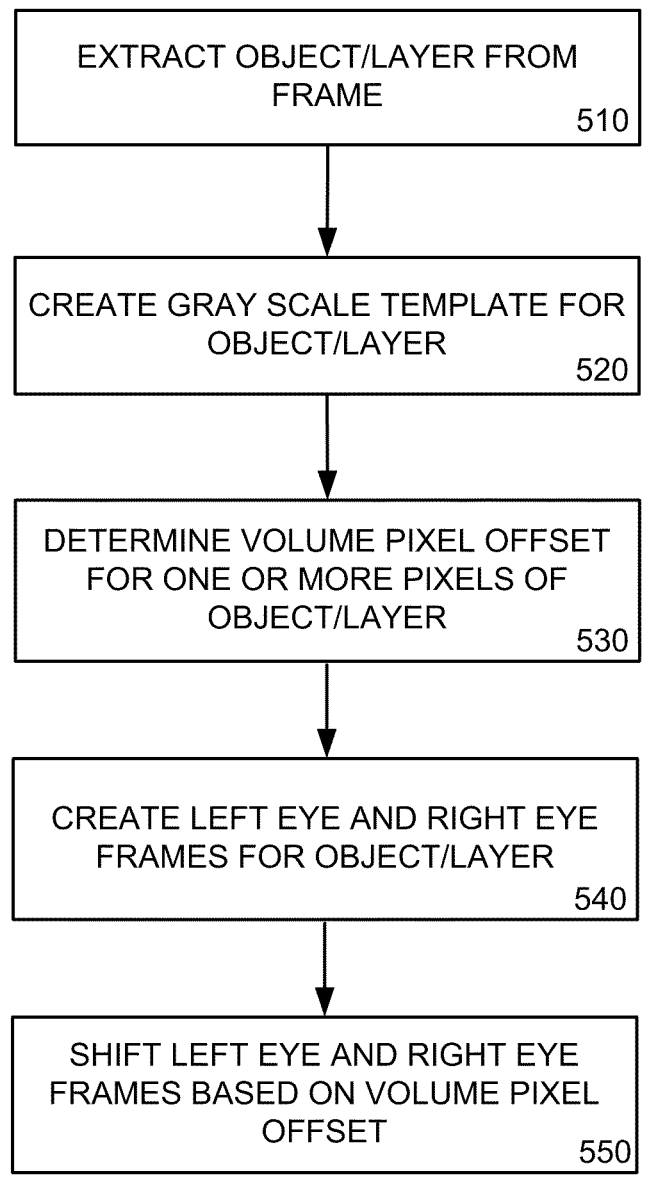
FIG. 5 is a flowchart for a method of adding volume to an object or layer of a 2-D frame.

One embodiment of the present disclosure applies stereoscopic volume to one or more of the objects of a 2-D frame such that the objects appear to have a volume when viewed as a stereoscopic 3-D frame. FIG. 5 is a flowchart of one method for generating stereoscopic volume for a 2-D frame or object. The operations of FIG. 5 may be performed by one or more computing systems, with some creative input and manipulation by an animator or artist. The method of FIG. 5 is described in the context of generating stereoscopic volume for an object or layer, which is obtained from a collection of layers that form a frame of a film. The method of FIG. 5, however, is not limited to such an environment and may be applied to a discrete image or a portion of an image in digitized form, although the image may originate from a hand drawn picture.

Figure 6A:
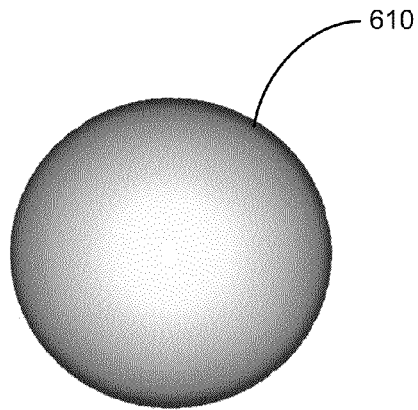
FIG. 6A is a diagram illustrating one example of a gray scale template for a generally circular object of a 2-D frame.

Beginning in operation 510, one or more layers or objects are extracted from the 2-D frame, selected or otherwise obtained. In operation 520, a gray scale template is created for the one or more extracted layers or objects. One example of a gray scale template for a generally circular object of a 2-D frame is shown in FIG. 6A. As shown, the gray-scaled template 610 is similar to the shape of the object and includes several shades of gray. In one embodiment, the gray scale template includes a representative pixel corresponding to each pixel of the 2-D object, with each representative pixels colored with a shade of gray. However, the gray scale template may be comprised of any number of pixels and shades of gray. In the example shown, the gray scale template 610 is whiter near the center of the template and darker near the edges of the template, with the pixels of the gray scale gradually becoming darker as one moves from the center of the template to the edges. While the gray scale template 610 shown uniformly radiates from the center of the gray scale template, it is not required that the gray scale be applied in such a manner. Generally, a gray scale template may correspond to an object in any manner such that each pixel of the template corresponds to one or more pixels of the object and includes a shade of gray (including white and black) from which a pixel offset may be determined.

Returning to FIG. 5, the computer system may determine a pixel offset for the object in operation 530 based on the gray scale template. The pixel offset determined in operation 530 may be a combination of the depth pixel offset applied to the layer from which the object is obtained and a volume pixel offset based on gray scale template. Generally, each pixel defining the object has an initial depth pixel offset that relates to the overall perceived depth of the object in the stereoscopic 3-D frame. Thus, the pixel offset determined in operation 530 may be in addition to the depth pixel offset already associated with the pixel. In alternate embodiments, a volume pixel offset may be associated with a particular pixel before the depth pixel offset is determined. Irrespective of the order in which the depth pixel offset and volume pixel offset are determined, the total pixel offset for any particular pixel of the 2-D frame may include both pixel offsets.

Figure 6B:
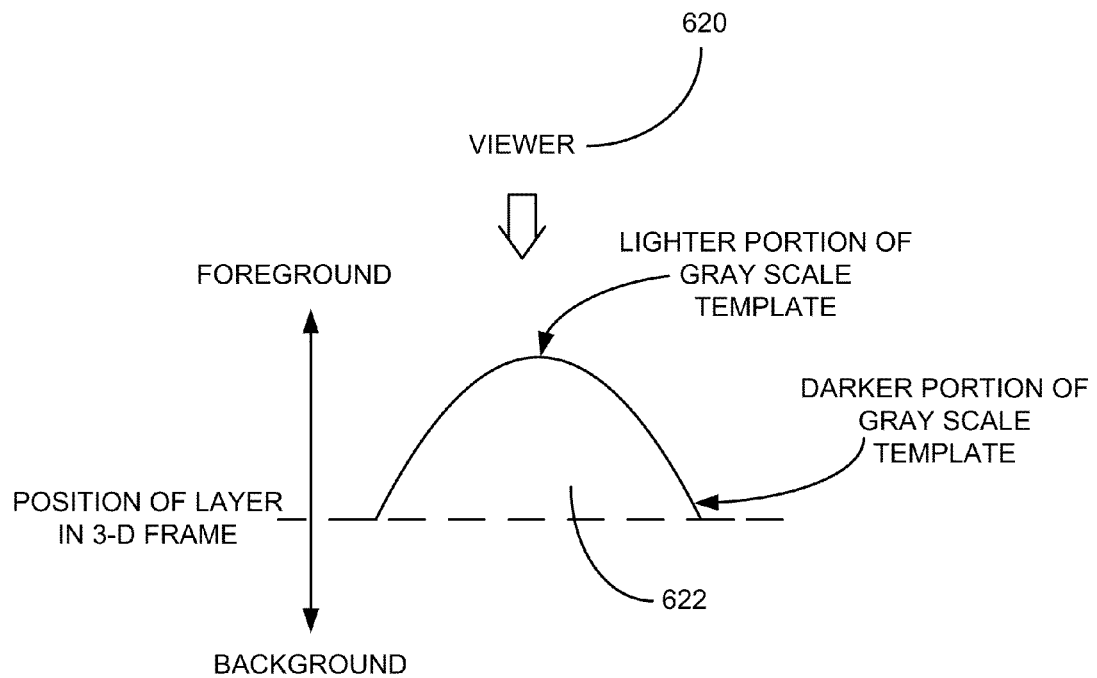
FIG. 6B is a diagram illustrating the volume effect of an object of a 2-D frame in relation to the gray scale template.

FIG. 6B is a diagram illustrating the volume effect of a generally round object of a 2-D frame in relation to a gray scale template. The diagram is a top view of the perceived volume of the round object of the 2-D layer corresponding to the gray scale template set out in FIG. 6A. Thus, to a viewer 620 of the stereoscopic 3-D frame, the object appears to extend into the foreground of the 3-D frame. As should be appreciated, the diagram of 6B is merely an illustration of the stereoscopic volume of an object. The object does not physically extend into the foreground of frame, but only appears as such when the left eye and right eye layers of the 3-D frame are viewed by the viewer.

As shown, the object 622, after application of the stereoscopic volume effect, appears to the viewer 620 to have a stereoscopic 3-D volume that is based on the gray scale template 610 provided in FIG. 6A. In this example, the whiter portions of the gray-scaled template 610 correspond to the center of the object while the darker portions of the gray-scale template map to the edges of the round object. Further, based on the shades of the gray scale template 610, the pixels of the object that correspond to the whiter portions of the gray scale template may have a greater volume pixel offset than that of the pixels of the object that correspond to the darker portions of the object, with each shade of gray between the white and dark portions receiving a sliding scale of volume pixel offsets. Thus, a pixel offset for each pixel of the round object may be determined based on the shades of gray contained within the gray scale template 610. Further, the larger the pixel offset the further into the foreground or background the pixel may be perceived in the 3-D frame. Thus, when the object 622 is rendered in stereoscopic 3-D, the center of the object (with larger pixel offsets) may appear further in the foreground of the stereoscopic 3-D frame when compared to the edges of the object (with smaller pixel offsets). In this manner, each pixel of the object may correspond to a shade of gray in the gray scale template and have an associated volume pixel offset that is based on the shade of gray for that particular pixel to provide the object with the appearance of stereoscopic volume or inflation.

It should be appreciated that the pixel offset applied to the object may be based on the gray scale template in any manner. For example, the darker portions of the gray-scaled template 610 may provide a larger pixel offset than the whiter portions, or only those pixels colored with a specific shade of gray from the gray scale template may have a volume pixel offset. Further, the pixel offset applied to a pixel of the object may place the pixel either in the foreground or in the background in relation to the other pixels of the object. In other words, the volume pixel offset for any particular shade of gray of the gray scale template may have a value as well as a direction (foreground or background). For example, a grayscale value of 50% gray could indicate no pixel offset at that pixel location while a value of black places the pixel in the background and a value of white places the pixel in the foreground with respect to the rest of the object. In general and used herein, however, those portions of the object with larger pixel offset may be perceived further from the rest of the object when viewed in stereoscopic 3-D. Those portions with smaller pixel offsets may have little to no stereoscopic 3-D effect applied. Further, each shade of gray within the gray scale template may have an associated volume pixel offset. Therefore, the object may have several pixel offsets associated with the pixels of the object corresponding to the many shades of gray within the gray scale template. Further, the more shades of gray utilized to acquire the pixel offset map, the more detailed the inflation technique may appear when rendered in stereoscopic 3-D. Finally, a scaling factor may also be applied when determining the pixel offset such that the amount of shift would be some percentage from 0% to 100% of a scaling factor. For example, a stereoscopic volume setting of 20 indicates a 20 pixel shift at white pixels whereas a stereoscopic volume setting of five indicates a five pixel shift at white pixels.

It should be noted that any method of pixel shifting may be used as described herein. Satisfactory results occur when using either the replacement or averaging methods utilized by most modern image processing software, whereby a pixel shift can either a) replace the pixel color that currently exists at the new pixel position or b) blend with the current pixel color with some form of averaging, blending or weighted averaging.

Returning to FIG. 5, once the volume pixel offset and depth pixel offset are determined, the computer system creates a left eye layer and a right eye layer for the object in operation 540. The creation of the paired frames may be similar to operation 160 of FIG. 1. Thus, the left eye layer and the right eye layer has similar content to the extracted 2-D layer, including the objects of the layer, such that the color of each pixel of the created layers remain similar to that of the original 2-D layer.

Figure 7:
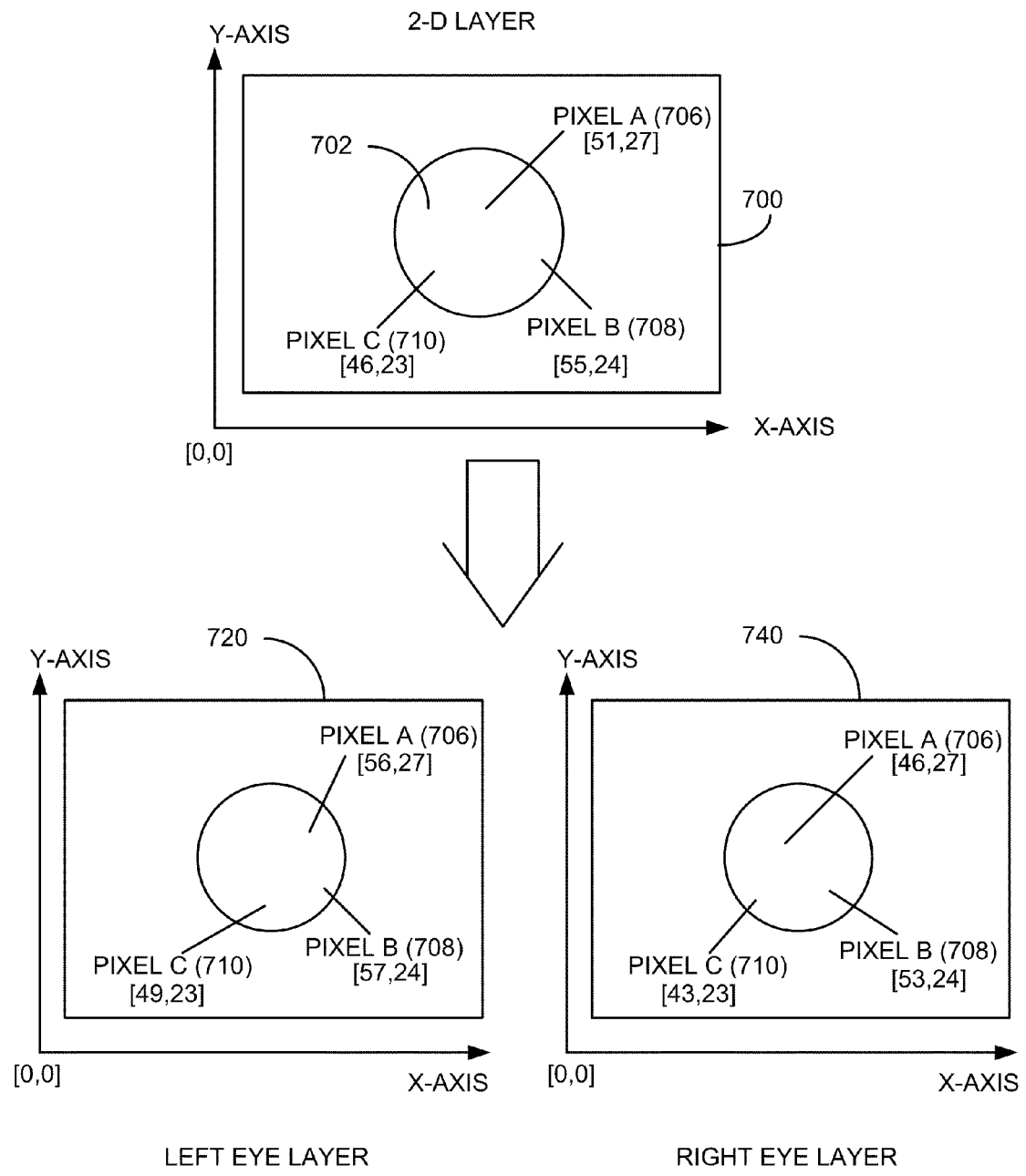
FIG. 7 is a diagram illustrating shifting a plurality of pixels of an object of a 2-D frame based on a volume pixel shift determined from a gray scale template.

Once created, the computer system may shift the pixels of the left eye and right eye layers by the determined volume pixel offset in operation 550. As mentioned, the pixel shift may include both the volume pixel offset and the location pixel offset to place the object within the z-axis of the stereoscopic 3-D frame as well as provide a volume to the object. FIG. 7 is a diagram illustrating shifting a plurality of pixels of an object of a 2-D frame based on a volume pixel shift determined from a gray scale template.

A 2-D layer 700 including a circular object 702 comprising a plurality of pixels is depicted. In particular, three pixels (A, B and C) of the object 702 are shown. The 2-D layer 700 is depicted as a graph where each pixel of the 2-D layer represents a [x,y] position within graph of the layer. Thus, the bottom left corner pixel of the layer may be designated by a [0,0] position. In this example, pixel A 706 is located at pixel position [51,27], pixel B 708 is located at pixel position [55,24] and pixel C 710 is located at pixel position [46,23].

To create a stereoscopic 3-D layer that corresponds to the 2-D layer 700, a left eye layer 720 and a right eye layer 740 are created, where each layer includes the same object of the 2-D layer. In addition, the pixels of the left eye layer 720 and the right eye layer 740 are shifted based on the determined volume pixel offset to provide the object 702 with a perceived volume. For example, assuming that the object 702 of the 2-D layer 200 has a similar gray scale template as depicted in FIG. 6A, the object may appear to be round when viewed in stereoscopic 3-D. In particular, those pixels located near the center of the object 702 have a volume pixel offset greater than the pixels located near the edge of the object. Stated differently, the center of the object 702 may appear further displaced from the layer than the edges of the object.

Assuming that the volume pixel offset operates on the object to make it appear as if the object extends from layer towards the viewer (into the foreground), than the pixels of the left eye layer are shifted to the right while the pixels of the right eye layer are shifted to the left, based on the determined volume pixel offset. Thus, as shown, pixel A 706 is shifted five pixels to the right in the left eye layer to a position of [56,27] while the same pixel is shifted five pixels to the left in the right eye layer to a position of [46,27]. Thus, the total pixel offset for pixel A 706 is ten pixels. Similarly, pixel B 708 is shifted two pixels to the right in the left eye layer to a position of [57,24] while the same pixel is shifted two pixels to the left in the right eye layer to a position of [53,24] for a total pixel offset of four pixels. Pixel C 710 is shifted three pixels to the right in the left eye layer to a position of [49,23] while the same pixel is shifted three pixels to the left in the right eye layer to a position of [43,23], for a total pixel offset of six pixels. As can be seen, the total pixel offset for pixel A (located near the center of the object 702) is greater than that of pixels B and C (located near the edge of the object). In this manner, the pixels of the object 702 may be shifted in response to the determined volume pixel shift to add a perceived volume to the object. It should be appreciated that the pixels may be shifted in either direction to move the pixel into the foreground or background of the stereoscopic 3-D frame.

Figure 8:
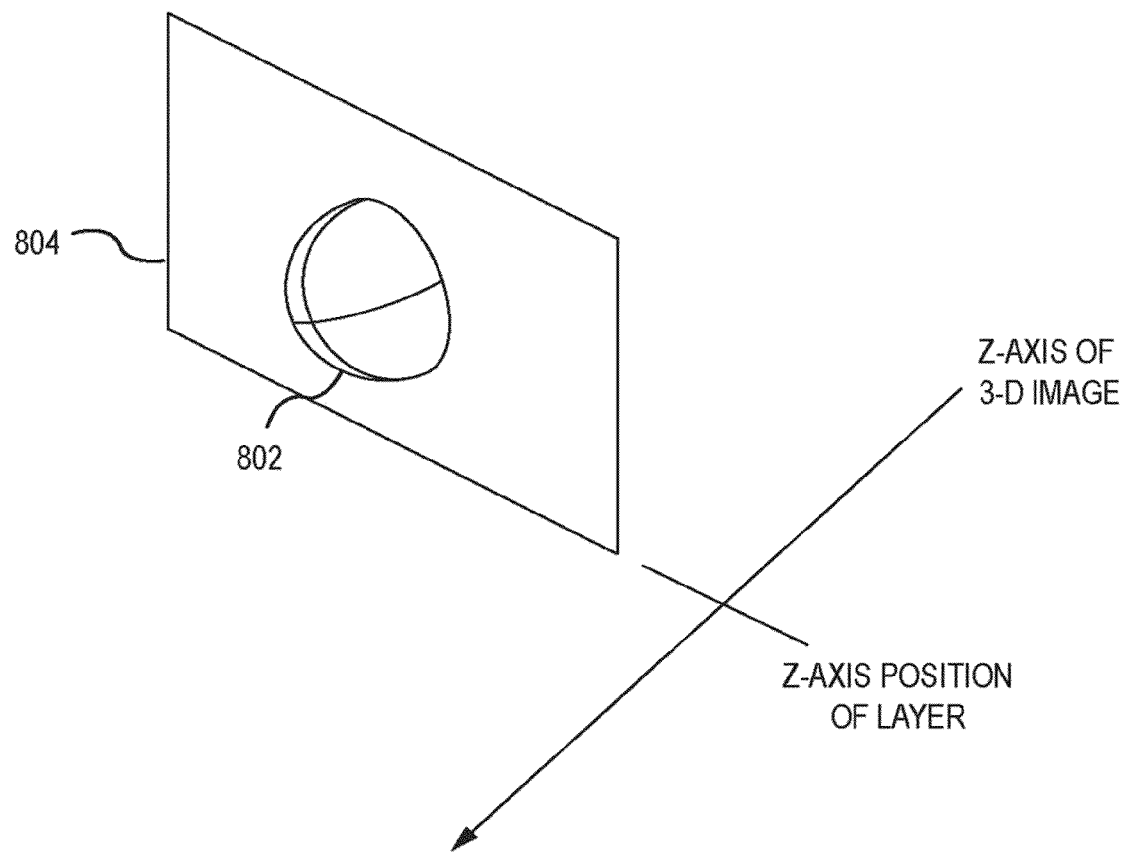
FIG. 8 is a flowchart of one such method for generating a gray scale template to a layer of a 2-D planar frame for purposes of adding volume to the object.

The pixel offset described in relation to FIG. 7 provides the object with a perceived stereoscopic volume effect. FIG. 8 is a diagram illustrating the perceived volume of the round object of FIG. 7 when the shifted left eye layer and the shifted right eye layer are viewed simultaneously. As can be seen, the object 802 appears to extend into the foreground (or positive z-axis) from the layer 804. Thus, when the left eye layer and the right eye layer of FIG. 7 are viewed simultaneously, the object 802 appears to have volume in relation to the layer 802.

While the gray scale template may be used as a map for an x-axis pixel offset in a single camera environment, the gray scale template may also be used to provide a stereoscopic volume effect to an object in a two camera environment. Several of the operations described herein may also be used in applying a gray scale template in a two camera system. Generally, in the two camera embodiment, an object or layer is extracted from a 2-D frame and a gray scale template is created as described herein. In addition, a malleable digital mesh copy of the extracted object or layer is created that approximates the shape and features of the object or layer. After creation of the mesh copy, the gray scale template may provide a map upon which the mesh copy may be stretched or otherwise altered along the z-axis of the 3-D frame to provide the object with a volume effect. For example, a circular mesh copy may be created for a round object extracted from a frame. The circular mesh copy may be capable of being stretched or altered in a positive z or negative z direction. Further, the circular mesh copy may have a corresponding gray scale template similar to that shown in FIG. 6A.

The application of the gray scale template 610 to the mesh copy 622 can be seen in relation to FIG. 6B. Thus, the mesh copy 622 may be stretched along the z-axis into the foreground of the 3-D frame based on the gray scale 610. Namely, the portions of the mesh copy 622 that correspond to the white portions of the gray scale 610 are stretched further along the z-axis than those portions that correspond to the dark portions. Thus, the mesh copy 622 may appear to extend into the foreground along the z-axis in response to the gray scale 610. In this manner, the gray scale template 610 provides a map from which the mesh copy 622 may be altered along the z-axis (either in the foreground or background direction) to provide the stereoscopic volume effect to the object.

Figure 9:
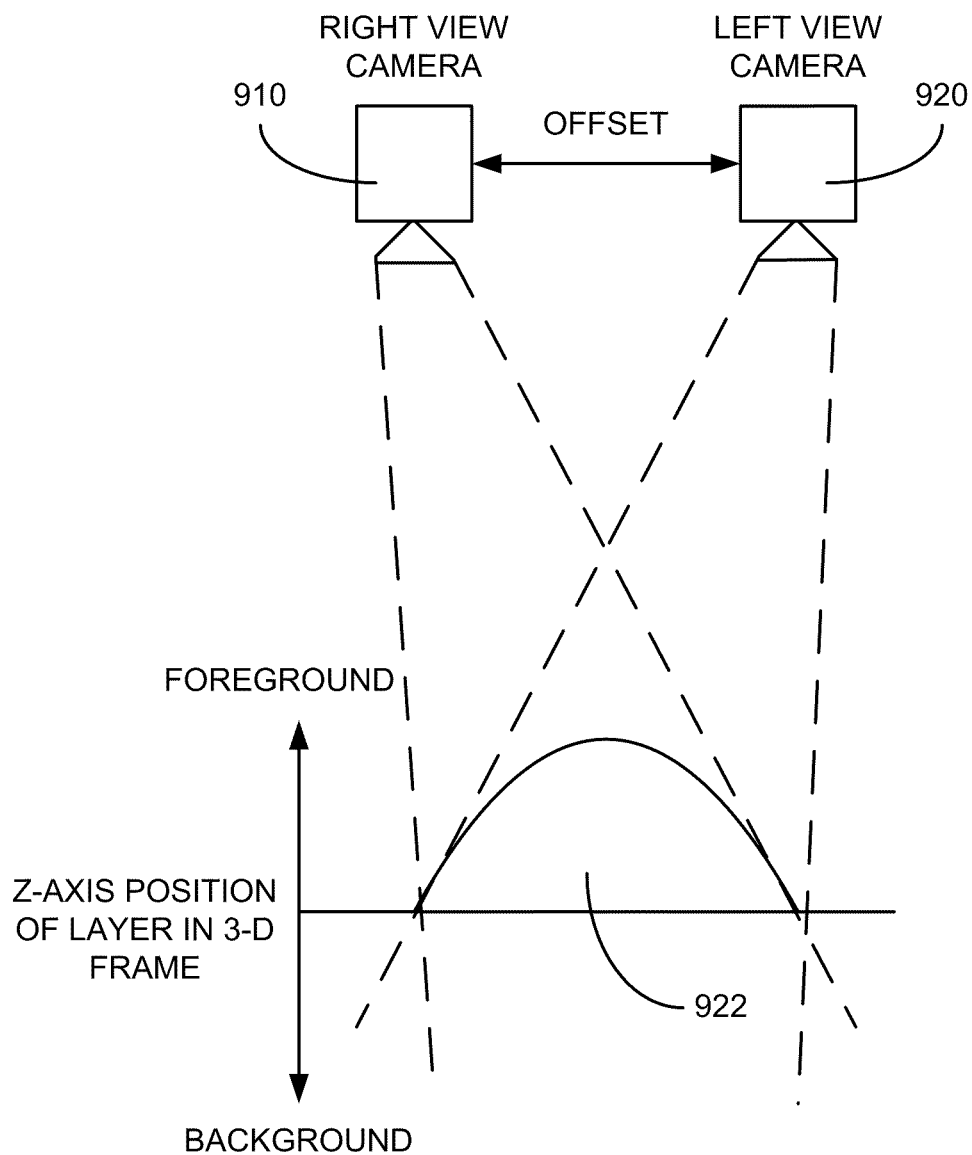
FIG. 9 is a diagram illustrating a virtual two camera system obtaining the left eye and right layers for a stereoscopic 3-D frame.

To create the left eye and right eye layers necessary for the stereoscopic 3-D frame, two offset virtual cameras to takes a picture of the altered mesh copy of the object. FIG. 9 is a diagram illustrating a virtual two camera system obtaining the left eye and right layers for a stereoscopic 3-D frame. In FIG. 9, the mesh copy 922 extends away from the layer along the z-axis into the foreground of the 3-D frame. Further, a right view camera 910 takes a right view virtual photo of the mesh copy 622 while a left view camera 920 takes a left view virtual photo of the mesh copy. The right view camera 910 and the left view camera 920 are offset such that each camera takes a slightly different virtual photo of the mesh copy 922. These two views provide the left eye and right eye layers necessary for the stereoscopic 3-D frame for the object. In this manner, a gray scale template may be utilized to create a stereoscopic volume effect in a two-camera system.

Figure 10:
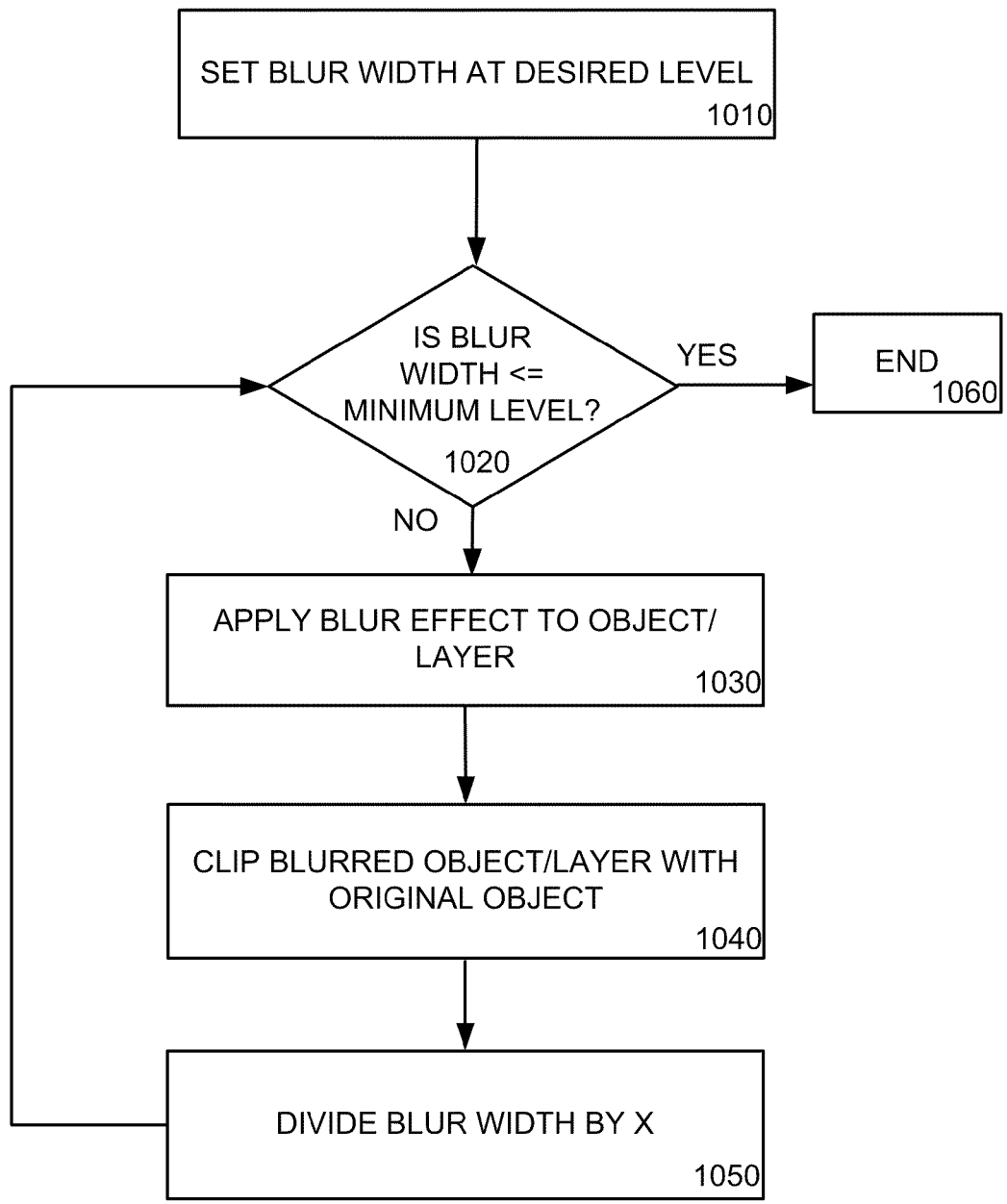
FIG. 10 is a flowchart of a method for applying a gray scale to an object or layer of a 2-D planar image for purposes of adding volume to the object when rendered in stereoscopic 3-D.

Several techniques may be utilized to create the gray scale template for an object or layer of the 2-D frame to achieve the volume effect to the layer when viewed in stereoscopic 3-D. FIG. 10 is a flowchart of one such method for generating a gray scale template for a layer or object of a 2-D planar frame for purposes of providing an object with stereoscopic volume. The operations of FIG. 10 may be performed by a computing system employing a blurring application and a clipping application. Generally speaking, the blurring application and the clipping application generate a grey scale template for the object and define the gray scale relative to borders of the object.

Figure 11:
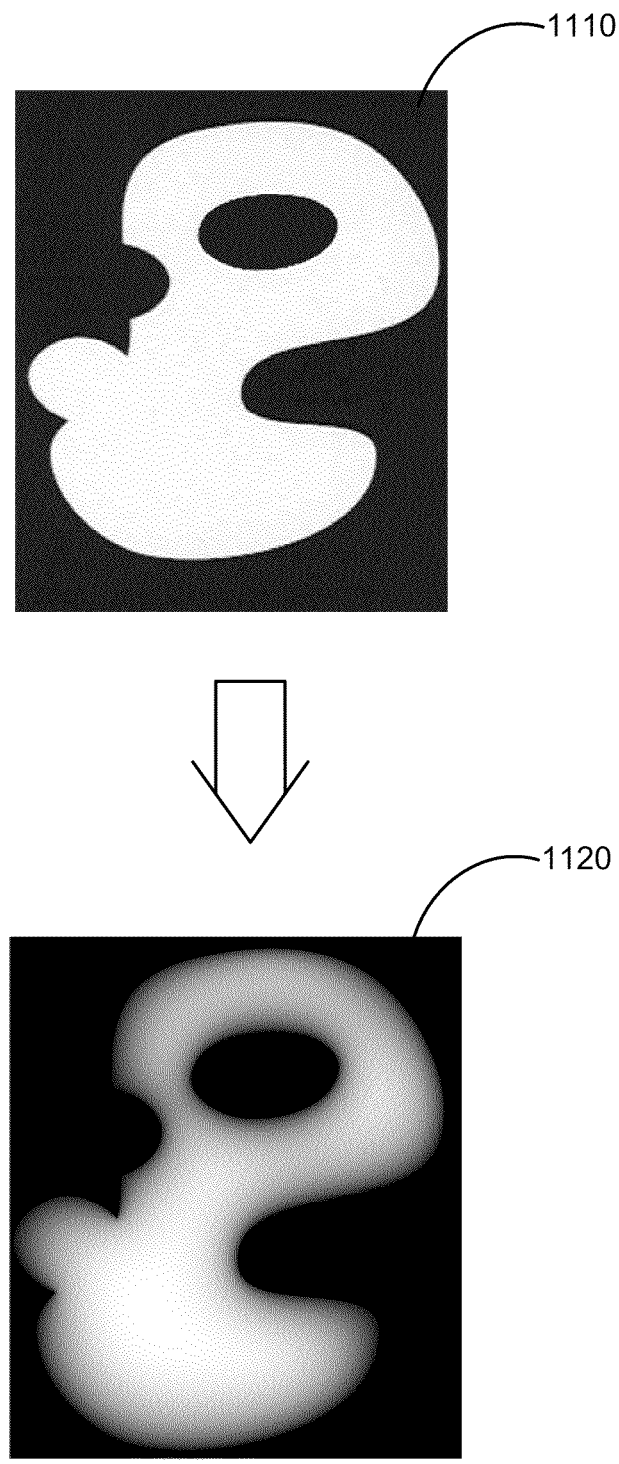
FIG. 11 is a diagram illustrating an object or layer of a 2-D planar frame with a gray scale applied to the object for purposes of adding volume to the object when rendered in stereoscopic 3-D.

The technique of FIG. 10 is best applied to an object that has been isolated from a layer. FIG. 11 is a diagram illustrating an object 1110 that has been isolated from a layer. The object 1110 shown in FIG. 11 is holdout matte, or alpha channel, of an object that generally includes color and other features (such as line drawings, shading, etc.) of the layer. As shown, the holdout matte 1110 of the object includes the outline of the original object with all color and features removed and replaced with a solid white color. This may be understood as a silhouette of the image. Further, it should be appreciated that, because the inflation technique may be applied to an entire object or only a portion of the object, the outline of the object to receive the inflation technique may be a small portion of an overall object. For example, the nose of a character object may be inflated separately from the rest of the character object. In this example, the nose of the character may be isolated from the rest of the object and whitened such that an outline silhouette of the nose remains with all pixels defining the nose as a white color, (i.e., a white silhouette of the nose). Several techniques for isolating portions of a layer are provided in United States patent applications Ser. No. 12/571,418 titled "APPARATUS AND METHOD FOR REMOVING INK LINES AND SEGMENTATION OF COLOR REGIONS OF A 2-D IMAGE FOR CONVERTING 2-D IMAGES INTO STEREOSCOPIC 3-D IMAGES" by Tara Handy Turner et. al., the contents of which are incorporated in their entirety by reference herein.

Returning to the method of FIG. 10 and beginning in operation 1010, the computing system sets a blur width. The blur width determines the amount of blur applied to an object. For example, a blurring application analyzes each pixel of an image and, applying several algorithms to the image, blends the color (in this case, white and black) of each pixel into several neighboring pixels of the image. This is generally achieved by replacing a pixel value with the weighted average of that pixel and some number of the neighboring pixels. Blurring may thus be understood as a convolution filter operation. The blur width typically determines the distribution width, or number of neighboring pixels, with which the color of each pixel is averaged or blended. Thus, the higher the blur width setting, the more pixels are averaged or blended, with the effect that spreading is applied to each pixel of the image. Generally, the higher the blur width, the more diffused the image will appear.

Continuing to operation 1020, the computer system determines whether the blur width is less than or equal to a minimum level. The minimum level can be any value smaller than the original blur, buy typically is a value within the blur operation which indicates a blur area so small as to have no visible effect on the image. For example, a blur radius of one pixel or less would have no visible effect on an image. Each image processing application or system may use different values to represent the blur width including, but not limited to, the pixel radius or a percentage of the image. Therefore, the value of the minimum level is generally defined within the environment of the image processing application being used.

If the blur width is not less than or equal to the minimum level, then a blur image processing effect is applied to the object in operation 1030. As described, the blurring effect may average the white and black colors of the pixels of the object at the edge of the white shape into the surrounding pixels. As a result, the blur effect may diffuse the edges of the object such that the object becomes less defined. Once blurred, a clip image processing effect may be applied to the blurred object in operation 1040. When the clip effect is applied to an object, the blurring of the object is bounded by the edges of the original object. For example, after blurring, the white pixel color of the object 1110 of FIG. 11 has spread beyond the edges of the object into the black background pixels and some of the black pixel color has been blended with the white pixels colors of the object. The clip process, therefore, clips the edges of the blurred object 1120 to match the shape of the original object such that the background pixels are returned to their original color, in this example, black leaving the blurred pixels inside the shape unchanged. Thus, the clip effect limits the blur effect such that the spread pixel colors do not typically extend past the shape of the original object 1110.

Returning to FIG. 10 and operation 1050, the blur width may be reduced by dividing by a variable, in this example variable "X". As should be appreciated, the value of X determines the number of iterations of the blur and clip process applied to the object. Generally, the higher the value of X, the fewer iterations of this process will occur. In one example, X may be set at a value of two such that the blur width is divided in half in operation 1050. In general, the more iterations of the blur and clip process that occurs, the more detailed the resultant gray scale becomes. Thus, few iterations provide a gray scale that transitions from white to gray roughly while many iterations provides a more fine transition between white and dark in the gray scale.

Upon the division of X, the process returns to operation 1020 to determine if the value of X is less than or equal to the minimum level. If not, the above process repeats using the original object 1110 for the clipping step 1040. If the value of X is less than or equal to the minimum level, then the process ends. Through the blur and clip effects applied to the object, a gray scale template for the object is created such that the edges of the object are darker than the center of the object. For example, the gray-scaled object 1120 shown in FIG. 11 is one example of a gray scale template created through the blur and clip process, useful to perform the stereoscopic volume/inflation technique. As can be seen, the black background pixel color provides a gray shade to the object 1120 such that the center of the object is near white while the edges become darker, with a gradual transition between the two colors throughout the object and going to black at the silhouette edges of the object in a continuous fashion.

The blur and clip process described above is but one method that may be utilized to create a gray scale template of an object from which a volume effect may be applied to the object. Several other techniques may also be utilized to create such a template. For example, it is not required that a gray scale be used as the template for the object. Rather, any color scheme containing several shades of the color may be used. To acquire the gray scale for an object as shown in FIG. 11, the object generally may be isolated from the rest of the frame and converted into a white frame on a black background. Thus, as the blur effect is applied, the white frame and black background begin to blend to create the gray scale effect that places the white portion of the scale to the center of the object and darker portions near the edge. In a similar manner, any color may be used to create the map scale. For example, the object may be converted into a pink color while the background may be a dark blue. Thus, as the blur and clip effects are applied, the center of the object may remain pink while the edges of the object may become more blue. The volume pixel offset determined for such an object may be based on the various shades of pink and blue that are created on the object. In this manner, any colors may be used to create the map from which the pixel offset for the volume effect may be derived.

Additionally, the gray scale template may be created by an artist or animator through an image processing program. For example, the artist may use a spray paint technique of a image processing program to create a gray scale template that mirrors an object of a layer. Alternatively, the artist may utilize several shape models or other means to color a pixel of an object in a shade of gray. Generally, any process that can be used to color a pixel may be utilized by an artist or animator to create a gray scale template.

Further, the techniques to create a gray scale template may not apply uniformly across the entire object. Instead, several cues may be first obtained from the frame to further refine the volume effect applied to the object. For example, the 2-D frame from which the object is extracted may be an animated frame. Thus, the object may have several ink lines that define several features of the object. Such ink lines may define the character's facial features, clothing and/or appendages. However, applying the blur and clip technique to the entire character object may inflate the character uniformly such that the center of the character is inflated without regard to the various features of the character. Thus, it may be desired to have a more detailed inflation of the character, one that accounts for the different features of the object to provide a more realistic inflation of the character.

In this example, the gray scale template that defines the pixel offset for the character object may take into account the ink lines. For example, the ink lines of the character that define the nose may be considered when inflating the character's head. In this example, the nose of the character may be inflated separately from the rest of the character's face such that the nose may extend further away from the character than the rest of the character's face when viewed in stereoscopic 3-D. By providing a separate volume pixel offset to the character's nose when compared to the rest of the character, a more detailed inflation of the character may appear to the viewer. Similarly, the character's arm may also be inflated separately from the rest of the character object such that the arm is placed in front of the rest of the character's body. In still another example, the individual muscles of the character's arm may also be inflated individually to give a high level of definition to the character's arm in stereoscopic 3-D. Thus, by utilizing the ink lines of the character or object, separate portions of the object may be inflated more or less than the rest of the object to provide a more detailed stereoscopic 3-D effect to the object. Several techniques may be utilized to identify and isolate portions of the object to perform inflation on those portions.

In addition to the ink lines of a drawing, other cues may also be used to create the gray scale template for the volume effect of the object. In one embodiment, the 2-D frame may include shading of the one or more objects of the frame. Such shading may be one indication of the particular shape of an object. For example, a round object may include shading to provide the appearance of the object being round when the object is viewed in 2-D. Such shading is typical in animated drawings. However, such shading may also provide an aid in determining how the volume effect is applied to object. By analyzing the shading of any object of a frame, the general shape of the object may be inferred. In general, any shading or other coloring effects that are applied to the frame may be used as a cue on how to apply the volume effect to the frame.

As mentioned, the above operations may be performed by a computing platform comprising one or more computing systems. Such a computing platform may analyze the 2-D frame and perform the steps of the methods outlined above to create a stereoscopic volume effect for the various layers or objects of the frame. Alternatively, the gray scale template may be created and applied to the object of the frame by an artist or computer programmer. The artist may utilize the various cues of the frame described above to create the gray scale template for the object. Such cues may include the ink lines and shadings of the object of the frame. Generally, an artist may manipulate the gray scale template in any manner to achieve the desired volume effect when the object is viewed in stereoscopic 3-D.

Figure 12:
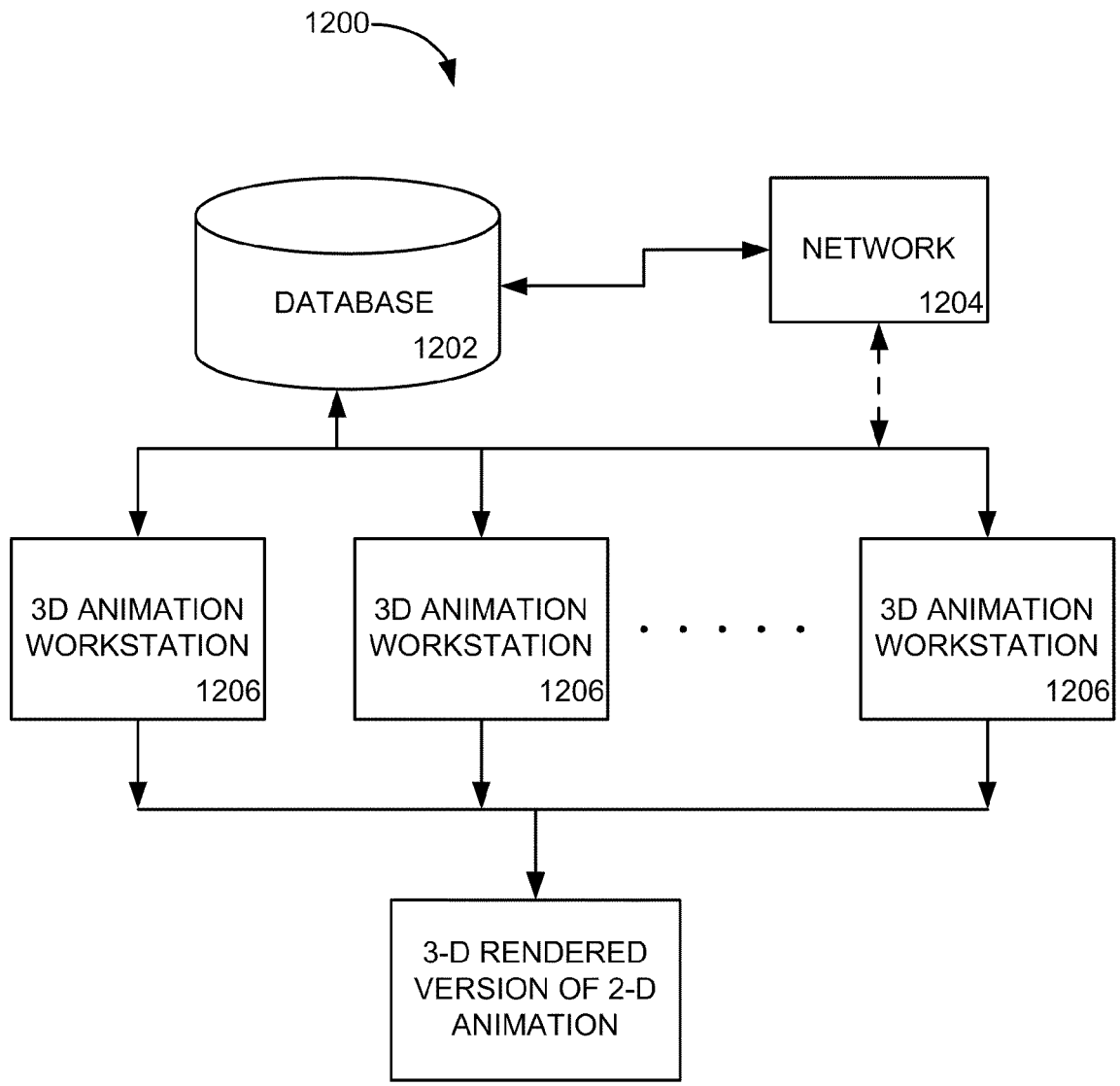
FIG. 12 is a high-level block diagram illustrating a particular system for converting a 2-D image of a multimedia presentation to a stereoscopic 3-D image.

FIG. 12 is a high-level block diagram illustrating a particular system 1200 for converting a 2-D frame of a multimedia presentation to a stereoscopic 3-D frame. The system described below may perform one or more of the operations described above with reference to FIGS. 1, 5 and 10.

The system 1200 may include a database 1202 to store one or more scanned or digitally created layers for each frame of the multimedia presentation. In one embodiment, the database 1202 may be sufficiently large to store the many layers of an animated feature film. Generally, however, the database 1202 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D frames may be stored on a network 1204 that is accessible by the database 1202 through a network connection. The network 1204 may comprise one or more servers, routers and databases, among other components to store the frame layers and provide access to such layers. Other embodiments may remove the database from the system 1200 and extract the various layers from the 2-D frame directly by utilizing the one or more computing systems.

The system 1200 may also include one or more computing systems 1206 to perform the various operations to convert the 2-D frames of the multimedia presentation to stereoscopic 3-D frames. Such computing systems 1206 may include workstations, personal computers, or any type of computing device, including a combination therein. Such computer systems 1206 may include several computing components, including but not limited to, one or more processors, memory components, I/O interfaces, network connections and display devices. Memory of the computing systems 1206 may be used for storing information and instructions to be executed by the processors. Memory also may be used for storing temporary variables or other intermediate information during execution of instructions by the processors of the computing systems 1206. In addition, the computing systems 1206 may be associated with the database 1202 to access the stored frame layers. In an alternate embodiment, the computing systems 1206 may also be connected to the network through a network connection to access the stored layers. The system set forth in FIG. 12 is but one possible example of a computer system that may employ or be configured in accordance with aspects of the present disclosure.

It should be noted that the flowcharts of FIGS. 1, 5 and 10 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for generating stereoscopic volume for a two dimensional digital image comprising:
    obtaining a first two dimensional image comprising a first image portion and a second image portion;
    generating a second two dimensional image comprising a duplicate of the first image portion and a duplicate of the second image portion;
    analyzing by a processing element a plurality of original pixels of the two dimensional digital image;
    creating a digital gray scale template, wherein a first set of pixels of the gray scale template correspond to the first image portion, a second set of pixels of the gray scale template correspond to the second image portion, and wherein whiter portions of the digital gray scale template correspond to pixels further in a foreground than darker portions of the digital gray scale template;
    determining automatically by the processor a volume effect for the first image portion based on one or more characteristics of the first image portion; and
    horizontally offsetting the first image portion relative to the duplicate of the first image portion a first amount and the second image portion relative to the duplicate of the second image a second amount, different from the first amount;
    wherein the first image and the second image are displayed substantially contemporaneously for stereoscopic viewing of the image; and
    the first amount is a combination of a depth pixel offset for a layer of the two dimensional image and a volume pixel offset corresponding to the volume effect for the first image portion.

2. The method of claim 1 wherein the first amount is a first x-axis pixel value and the second amount is a second x-axis pixel value different than the first x-axis pixel value.

3. The method of claim 1, wherein the first amount is based on a first pixel color of the first set of pixels of the digital gray scale template and the second amount is based on a second pixel color of the second set of pixels of the digital gray scale template, the first pixel color different from the second pixel color.

4. The method of claim 1, wherein the duplicate of the first image portion is shifted along an x-axis of the second image by the first x-axis pixel value and the duplicate of the second image portion is shifted along the x-axis of the second image by the second x-axis pixel value.

5. The method of claim 1 further comprising:
    determining a depth pixel offset for the second image portion, the depth pixel offset corresponding to a perceived z-axis position for the second image and the first image in a corresponding stereoscopic image;
    determining a volume pixel offset for the second image portion, the volume pixel offset corresponding to a perceived volume of the second image portion; and
    horizontally offsetting the second image in relation to the first image by the depth pixel offset such that the duplicate of the first image portion and the duplicate of the second image portion appear in a perceptual z-axis position in the corresponding stereoscopic image and
    horizontally offsetting the second image portion in relation to the first image by the volume pixel offset.

6. The method of claim 1 wherein the operation of generating a second image comprises:
    generating a mesh of the second image portion, the mesh comprising x and y values approximating a two dimensional shape of the second image portion;
    obtaining a depth object for the mesh of the second image portion, the depth object comprising a plurality of z-dimension values; and
    warping the mesh in a z-dimension as a function of the z-dimension values of the depth object.

7. The method of claim 6 wherein the depth object is the digital gray scale template with one or more pixels that correspond to the second image portion and the plurality of z-dimension values relates to the shades of gray of the digital gray scale template.

8. The method of claim 7 wherein the digital gray scale template is created through the operations of:
    obtaining a digital matte of the second image portion, the digital matte comprising a plurality of white pixels corresponding to the second image portion;
    blurring the digital matte; and
    clipping the blurred matte with the shape of the digital matte.

9. The method of claim 8, wherein creating the digital gray scale template further comprises the operation of surrounding edges of the digital matte with a plurality of black pixels.

10. The method of claim 9, wherein the blurring operation comprises:
    setting a first blur width; and
    averaging the white pixels and the black pixels with one or more neighboring pixels to create a plurality of blended pixels; wherein
    the first blur width determines the number of neighboring pixels.

11. The method of claim 10, wherein the clipping operation comprises:
    defining one or more boundaries corresponding to the edges of the digital matte; and
    coloring any blended pixels falling outside of the one or more boundaries black.

12. The method of claim 6 further comprising:
    generating a duplicate of the second image portion by taking a virtual digital photo of the warped mesh of the second image portion from a non-perpendicular virtual position, wherein the second image portion and the duplicate of the second image portion are displayed substantially contemporaneously for stereoscopic viewing of the duplicate of the second image portion and the second image portion.

13. The method of claim 1, wherein the analyzing operation comprises:
    creating a blurring image comprising
        a background portion comprising a plurality of first color pixels; and
        a silhouette portion comprising a plurality of second color pixels, wherein the silhouette portion corresponds to a silhouette of the first image portion; and
    selectively blurring the first color pixels of the background portion and the second color pixels of the silhouette portion together to define a blurred silhouette.

14. The method of claim 1, wherein determining the volume effect comprises
setting pixels of the first image portion corresponding to pixels in the blurred silhouette having a larger percentage of the first color in the pixels of the blurred silhouette further in a background; and
setting pixels of the first image portion corresponding to pixels in the blurred having a smaller percentage of the first further in the foreground.

15. The method of claim 1, wherein the one or more characteristics of the original pixels comprises at least one of:
one or more ink lines defining one or more features within the two dimensional image;
shade lines of one or more objects within the two dimensional image; or
silhouettes of one or more objects within the two dimensional image.

16. A method for generating a stereoscopic image from a two dimensional image comprising:
obtaining a two dimensional digital image comprising a first plurality of pixel values;
analyzing by a processing element by the two-dimensional digital image; and
creating automatically by the processing element obtaining a gray scale object created from the two-dimensional digital image based on one or more characteristics of the first plurality of pixels in the two-dimensional image, the gray scale object having a plurality of gray scale values relative to each of the first plurality of pixel values wherein whiter portions of the gray scale object correspond to pixels further in a foreground than darker portions of the gray scale object;
obtaining a copy of the two dimensional image comprising a second plurality of pixel values corresponding to the first plurality of pixel values; and
horizontally displacing one or more of the second plurality of pixel values based upon the gray scale values of the gray scale object, wherein the displacement amount of the one or more of the second plurality of pixel values is based on both a depth pixel offset and a volume pixel offset.

17. The method of claim 16 further comprising horizontally displacing the second plurality of pixel values uniformly relative to the first plurality of pixel values.

18. The method of claim 16 further comprising horizontally displacing one or more of the first plurality of pixel values based upon the gray scale values of the gray scale object.

19. The method of claim 16 further comprising extracting a layer from a two dimensional frame comprising a plurality of layers, the layer comprising the two dimensional digital image.

20. The method of claim 16 wherein a darker gray scale values of the gray scale object correspond to less horizontal displacement of the second plurality of pixel values and a lighter gray scale values of the gray scale object correspond to more horizontal displacement of the second plurality of pixel values.

21. The method of claim 16 wherein the gray scale object is obtained through the operations of:
obtaining a digital matte corresponding to the first plurality of pixel values, the digital matte comprising a plurality of white pixels;
blurring the digital matte; and
clipping the blurred matte with the shape of the digital matte.

22. The method of claim 16 wherein the two dimensional digital image and the copy of the two dimensional digital image are displayed substantially contemporaneously for stereoscopic viewing of the image and copy of the image.

23. A system for generating a stereoscopic frame comprising:
a database configured to store a two dimensional frame comprising a first plurality of pixels; and
one or more computing systems associated with the database to access the two dimensional frame, the computing systems configured to perform the operations of:
retrieving the two dimensional frame;
generating a copy of the frame, the copy comprising a copy of the first plurality of pixels values;
analyzing by a processor the two dimensional frame;
creating automatically by the processor a gray scale object of the frame based on one or more characteristics of the first plurality of pixels, the gray scale object having a plurality of gray scale values relative to each of the first plurality of pixel values wherein whiter portions of the gray scale object correspond to pixels further in a foreground than darker portions of the gray scale object;
generating a copy of the two dimensional frame comprising a second plurality of pixel values corresponding to the first plurality of pixel values; and
horizontally displacing one or more of the second plurality of pixel values based upon the gray scale value for the first plurality of pixel values, wherein the amount of the horizontal displacement is a combination of a depth pixel offset for layer of the two dimensional frame and a volume pixel offset for a first image portion of the two-dimensional image.

24. The system of claim 23 further comprising:
a network configured to store aspects of the two dimensional frame, wherein the database is further configured to retrieve the aspects of the two dimensional frame from the network.

25. The system of claim 23 wherein the one or more computing systems further comprise a network connection, the one or more computing systems further configured to retrieve the two dimensional frame from a network through the network connection.

* * * * *